Patented Oct. 8, 1935

2,016,328

UNITED STATES PATENT OFFICE 2,016,328

PROCESS OF PRODUCING SULPHITE CELLULOSE

Gustaf Haglund, Stockholm, Sweden, assignor to Patentaktiebolaget Gröndal - Ramén, Stockholm, Sweden No Drawing. Application February 1, 1934, Serial No. 709,329. In Sweden March 7, 1933

10 Claims. (Cl. 92—11)

This invention relates to the production of cellulose pulp and has for an object the provision of an improved process for producing sulphite cellulose.

In the production of sulphite cellulose by digestion with calcium bisulphite, "excess $SO_2$", i. e., $SO_2$ in excess of the amount necessary to combine as bisulphite with the entire amount of calcium introduced, must be present during the whole cooking period. This is necessitated by the fact that calcium bisulphite, under the conditions prevailing during the course of the sulphite digestion, is not sufficiently soluble and stable to remain in solution as such, and consequently, if a sufficient excess of $SO_2$ should not be present, the calcium bisulphite would be decomposed to form calcium monosulphite, which is insoluble and which would, therefore, be deposited on the cellulose fibres. On the other hand, when using bisulphites of an alkali metal in a digestion process it is not necessary that "excess $SO_2$" be present, for all alkali metal bisulphites are soluble, irrespective of the presence of $SO_2$.

The presence of considerable quantities of "excess $SO_2$" during the first step of the cooking process induces an acid hydrolysis of the crude cellulose material at too early a stage of the digestion process, and accordingly results in a lowered recovery of cellulose and in the production of a product of inferior quality. In the practice of the alkali bisulphite process it has been proposed, therefore, to carry out the digestion in two steps, first, a preliminary cooking with a cooking liquor containing no "excess $SO_2$", or a very small quantity thereof, and second, a final cooking with a cooking liquor containing that quantity of "excess $SO_2$" necessary to carry out the digestion. During the first cooking step a sulphonating of the crude material takes place, whereas during the final cooking the hydrolysis proper is effected. Obviously this method of carrying out the digestion can not be practiced in the calcium bisulphite process, because in the latter process, as pointed out above, excess $SO_2$ is necessary at all stages. Among the great advantages of the two-step process, the following might be enumerated: (a) a higher cellulose recovery is obtained, (b) the cellulose prepared is of better and more uniform quality than that obtained by other processes, and (c) the digestion is carried out at a higher and more uniform rate of speed. A further advantage lies in the fact that woods which can not be digested by the calcium bisulphite method can be digested by this process.

The alkali bisulphite method, however, suffers a disadvantage in that it is necessary for economic reasons to regenerate the alkali of the waste liquors, whereas the waste liquors of the calcium bisulphite process, because of the cheapness of the lime, can be discarded. In the alkali bisulphite process, therefore, special apparatus is required for the recovery of the alkali salts, and for this a heavy capital expenditure is required. Moreover, a loss of alkali amounting to about 10 to 15% of the total quantity employed can not be avoided, even when the regeneration is carried out as carefully as possible.

The present invention provides a process for the production of sulphite cellulose, which comprises using sulphurous acid salts of alkali metals, calcium bisulphite and "excess $SO_2$" as cooking agents, whereby the same advantages are obtained as in the alkali bisulphite process mentioned above, in which the digestion is performed in two steps with different cooking liquors. The necessity of regenerating the waste liquor no longer exists, for in the process of the present invention the loss of alkali is no greater than the loss suffered in a process involving regeneration of the alkali salts.

Briefly, the process of the present invention is carried out as follows: the cellulose-containing crude material is first subjected to a preliminary cooking with a solution of sulphurous acid salts of an alkali metal containing substantially no "excess $SO_2$" and subsequently a final digestion is carried out using a solution containing calcium bisulphite together with the quantity of "excess $SO_2$" required to effect complete disintegration of the crude material.

The solution employed in the preliminary digestion may comprise alkali monosulphites or alkali bisulphites or a mixture of both, "excess $SO_2$" naturally being absent if some monosulphites are used. The calcium bisulphite solution employed in the final digestion may be of substantially the same composition as the cooking liquor of the generally adopted calcium bisulphite process, differing therefrom in that the calcium bisulphite content of the solution used in the present invention may be considerably lower.

The process of the present invention will be better understood from a consideration of the following description of my preferred practice.

A digester is filled with chips of wood in the usual manner, whereupon the solution for the preliminary digestion, comprising, for example, sodium bisulphite at a suitable concentration, is added. The contents of the digester are then heated in any appropriate manner, to a suitable temperature, for example 125-140° C., whereupon a sulphonating of the crude material takes place.

Upon completion of the preparatory cooking step, a portion of the solution is, if necessary, withdrawn, in order that a sufficient volume of the solution with which the final cooking is to be effected may be admitted. This solution, comprising calcium bisulphite of a suitable composition and containing substantially the quantity of "excess $SO_2$" necessary for complete digestion, is then added, after which addition the digestion is continued and finally finished. During this latter stage of the digestion there occurs a hydrolysis of the crude material similar to that which takes place when cooking with a calcium bisulphite solution in the ordinary process.

The heating of the digester may be effected directly with steam or indirectly. The cooking liquor may be circulated through the digester during either a whole or a part of the digestion cycle, or such circulation may be omitted. The preparatory cooking step may be carried out in a digester other than the one in which the final digestion takes place, although it is, as a rule, most profitable to carry out both steps in one digester.

The quantity of cooking liquor used during the preparatory cooking step may be adjusted so that the chips are either wholly or only partially immersed; in the latter case, the cooking liquor is preferably circulated while the digestion is taking place.

The concentration of the sulphurous acid salts in the cooking liquor may be varied within wide limits. When withdrawing the cooking liquor after completion of the preliminary cooking step, care should be taken to see that the amount of cooking liquor that remains in the digester contains an insufficient quantity of base in the form of sulphurous acid salts of alkali metals to effect a complete digestion of the crude material, and in any event no greater amount of cooking liquor should remain than that corresponding to the amount of alkali salts that may be wasted during the digestion. If desired, the preliminary cooking liquor may be completely withdrawn before the calcium bisulphite solution is added; such procedure is especially suitable when the first and the final digestions are carried out in separate digesting vessels. Under all circumstances, the content of calcium bisulphite in the final cooking liquor should be adjusted to the amount of alkali salts absorbed by the chips and/or contained in that portion of the preliminary cooking liquor that is allowed to remain in the digester, so that the total base content of the final cooking liquor will correspond substantially to the amount required for a complete digestion of the partially cooked material.

The liquor withdrawn upon completion of the preliminary cooking step may be employed in a new preliminary cooking step, after a suitable quantity of alkali salts have been added to make up for the amount consumed during the first preliminary cooking step.

The process of the present invention may be employed to obtain results which are equally as good with respect to quality and recovery as may be obtained in employing the alkali bisulphite process described above in which digestion is carried out in two steps with different cooking liquors. At the same time, the process of the present invention is substantially less expensive than the ordinary process, for costly alkali recovery apparatus, and the expenses incidental to the maintenance and operation thereof, are eliminated, and the loss of alkali does not exceed that sustained in the ordinary alkali bisulphite process.

I claim:—

1. A process for the production of sulphite cellulose which comprises subjecting cellulose-containing material successively to the action of a solution comprising an alkali metal compound of sulphurous acid and a solution comprising calcium bisulphite and excess sulphur dioxide.

2. A process for the production of sulphite cellulose which comprises subjecting cellulose-containing material successively to the action of a solution comprising alkali metal monosulphite and a solution comprising calcium bisulphite and excess sulphur dioxide.

3. A process for the production of sulphite cellulose which comprises subjecting cellulose-containing material successively to the action of a solution comprising alkali metal bisulphite and to the action of a solution comprising calcium bisulphite and excess sulphur dioxide.

4. A process for the production of sulphite cellulose which comprises subjecting cellulose-containing material successively to the action of a solution comprising a mixture of alkali metal bisulphite and alkali metal-monosulphite and a solution comprising calcium bisulphite and excess sulphur dioxide.

5. A process for the production of sulphite cellulose which comprises subjecting cellulose-containing material successively to the action of a solution substantially free from sulphur dioxide and comprising an alkali metal compound of sulphurous acid and a solution comprising calcium bisulphite and excess sulphur dioxide.

6. A process for producing sulphite cellulose which comprises subjecting crude cellulose-containing material to a preliminary cooking operation in the presence of a solution containing one or more alkali metal salts of sulphurous acid and substantially free of excess sulphur dioxide, and subjecting the resulting cellulose product to a final cooking operation in the presence of a solution containing calcium bisulphite and sufficient excess sulphur dioxide to complete the disintegration of the crude material.

7. A process according to claim 6, in which the cellulose product is separated from at least a portion of the cooking liquor employed in the preliminary cooking operation prior to the treatment of the cellulose product in the final cooking operation, the quantity of preliminary cooking liquor retained with the chips being such that the amount of base in the form of sulphurous acid salts contained therein is insufficient to effect complete disintegration of the cellulose product.

8. A process according to claim 6, in which the cellulose product is separated from at least a portion of the cooking liquor employed in the preliminary cooking operation prior to the treatment of the cellulose product in the final cooking operation, the quantity of preliminary cooking liquor retained with the chips being such that the amount of base in the form of sulphurous acid salts contained therein is insufficient to effect complete disintegration of the cellulose product, and the content of calcium bisulphite in the final cooking liquor is adjusted to the quantity of alkali metal salts in the preliminary cooking liquor retained with the cellulose product so that the total base content of the final cooking liquor will correspond to that required to complete the disintegration of the crude material.

9. A process for producing sulphite cellulose which comprises subjecting crude cellulose-containing material to a preliminary cooking operation in the presence of a solution containing one or more alkali metal salts of sulphurous acid and substantially free of excess sulphur dioxide, separating the resulting cellulose product from at least a portion of the cooking liquor employed in the preliminary cooking operation, the quantity of preliminary cooking liquor retained with the cellulose product being such that the amount of base in the form of sulphurous acid salts contained therein is insufficient to effect complete disintegration of the cellulose product, regenerating the preliminary cooking liquor separated from the cellulose product for the preliminary treatment of additional crude cellulose-containing material, and subjecting the cellulose product to a final cooking operation in the presence of a solution containing calcium bisulphite and sufficient excess sulphur dioxide to complete the disintegration of the crude material.

10. A process for producing sulphite cellulose which comprises subjecting crude cellulose-containing material to a preliminary cooking operation in the presence of a solution containing one or more alkali metal salts of sulphurous acid and substantially free of excess sulphur dioxide, separating the resulting cellulose product from at least a portion of the cooking liquor employed in this preliminary cooking operation, the quantity of preliminary cooking liquor retained with the cellulose product being such that the amount of base in the form of sulphurous acid salts contained therein is insufficient to effect complete disintegration of the cellulose product, regenerating the preliminary cooking liquor separated from the cellulose product for the preliminary treatment of additional crude cellulose-containing material, subjecting the cellulose product to a final cooking operation in the presence of a solution containing calcium bisulphite and sulphur dioxide in which the content of calcium bisulphite is adjusted to the quantity of alkali metal salts in the preliminary cooking liquor retained with the cellulose product so that the total base content of the final cooking liquor will correspond to that required to complete the disintegration of the crude material and in which sufficient excess sulphur dioxide is present to complete the disintegration of the crude material.

GUSTAF HAGLUND.